United States Patent
Huang et al.

(10) Patent No.: US 9,047,833 B2
(45) Date of Patent: *Jun. 2, 2015

(54) METHOD FOR DRIVING LIQUID CRYSTAL DISPLAY AND LIQUID CRYSTAL DISPLAY USING SAME

(71) Applicant: INNOLUX CORPORATION, Miao-Li County (TW)

(72) Inventors: Shun-Ming Huang, Miao-Li County (TW); Deng-Tzung Tang, Miao-Li County (TW); Yaw-Shing Tseng, Miao-Li County (TW); Kun-Hsien Yang, Miao-Li County (TW); Wen-Hao Wu, Miao-Li County (TW)

(73) Assignee: INNOLUX CORPORATION, Miao-Li County, Taiwan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/281,566

(22) Filed: May 19, 2014

(65) Prior Publication Data

US 2014/0253529 A1 Sep. 11, 2014

Related U.S. Application Data

(63) Continuation of application No. 13/149,770, filed on May 31, 2011, now Pat. No. 8,766,961.

(51) Int. Cl.
*G09G 5/00* (2006.01)
*G09G 3/36* (2006.01)

(52) U.S. Cl.
CPC ............ *G09G 3/3614* (2013.01); *G09G 3/3648* (2013.01); *G09G 2310/0224* (2013.01); *G09G 2310/08* (2013.01); *G09G 2320/0252* (2013.01); *G09G 2330/021* (2013.01)

(58) Field of Classification Search
CPC .................... G09G 3/3614; G09G 2320/0247; G09G 2310/0202; G09G 2310/0213; G09G 2310/0251
USPC ......................................................... 345/209
See application file for complete search history.

(56) References Cited

U.S. PATENT DOCUMENTS

| | | | |
|---|---|---|---|
| 8,766,961 B2 * | 7/2014 | Huang et al. .................. | 345/209 |
| 2005/0146490 A1 * | 7/2005 | Kang et al. ..................... | 345/76 |
| 2007/0229433 A1 * | 10/2007 | Jang ................................ | 345/96 |
| 2014/0253530 A1 * | 9/2014 | Huang et al. .................. | 345/209 |

* cited by examiner

*Primary Examiner* — Lixi C Simpson
(74) *Attorney, Agent, or Firm* — Li & Cai Intellectual Property (USA) Office

(57) ABSTRACT

An exemplary liquid crystal display (LCD) provides data lines, gate lines, and pixel units arranged as a matrix array. A method for driving the LCD includes a step of analyzing and determining polarities of one column of the pixel units as determining pixels, thereby defining a first polarity group and a second polarity group, and a step of sequentially applying corresponding data signals to a part of the whole pixel units that are arranged at same rows with the first polarity group in a part of a period of a frame. Corresponding data signals are sequentially applied to the other part of the whole pixel units that are arranged at same rows with the second polarity group in another part of a period of a frame.

20 Claims, 10 Drawing Sheets

METHOD FOR DRIVING LIQUID CRYSTAL DISPLAY AND LIQUID CRYSTAL DISPLAY USING SAME

CROSS REFERENCE TO RELATED APPLICATION

This application is a continuation of U.S. application Ser. No. 13/149,770 filed on 31 May 2011 and entitled "METHOD FOR DRIVING LIQUID CRYSTAL DISPLAY AND LIQUID CRYSTAL DISPLAY USING SAME", now in condition for allowance.

BACKGROUND

1. Technical Field

The present disclosure relates to a method for driving a liquid crystal display (LCD) and an LCD using the driving method, and more particularly to a driving method that can ensure each pixel of the LCD is charged sufficiently.

2. Description of Related Art

Since LCDs have the advantages of portability, low power consumption, and low radiation, they have been widely used in various portable electronic products, such as notebook computers and personal digital assistants (PDAs). LCDs are also steadily replacing cathode ray tube (CRT) monitors commonly used with personal computers.

Typically, such an LCD displays an image by changing intensity of an electric field in each pixel of the LCD to control twist angles of liquid crystal molecules in each pixel, thereby changing light transmittance of the liquid crystal molecules to display different gray scales. However, if the electric field maintains a same electric field direction for a long time, the liquid crystal molecules may decompose and then cannot change their twist angles according to the change of the electric field. For solving such a problem, an inversion driving method is typically used for driving the LCD. There are various inversion methods. For example, in a line inversion method, polarity inversion of data is carried out between the pixels arranged adjacent to each other in a vertical line direction. In a column inversion method, polarity inversion of data is carried out between the pixels arranged adjacent to each other in a horizontal line direction. In a dot inversion method, polarity inversion of data is carried out between the pixels arranged adjacent to each other in both vertical and horizontal line directions.

In the dot inversion method, the polarities of data signals respectively supplied both to the vertically-adjacent pixels and the horizontal-adjacent pixels are opposite to each other, and then flicker is minimized in both the vertical and horizontal directions. Accordingly, the method is applied to most LCDs commercially available as monitors or televisions. However, one drawback of the dot inversion method is a high power consumption because the polarity of each data signal should be inverted at intervals of a short period. In addition, because when the data signal shifts its polarities, an electric charge time is needed. The electric charge time may be insufficient, especially for the data signals having a high frequency transition period.

What is needed, therefore, is a driving method and an LCD using the driving method that can overcome the above-described deficiencies.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

Reference will now be made to the drawings to describe certain exemplary embodiments of the present disclosure in detail.

Figure 1:
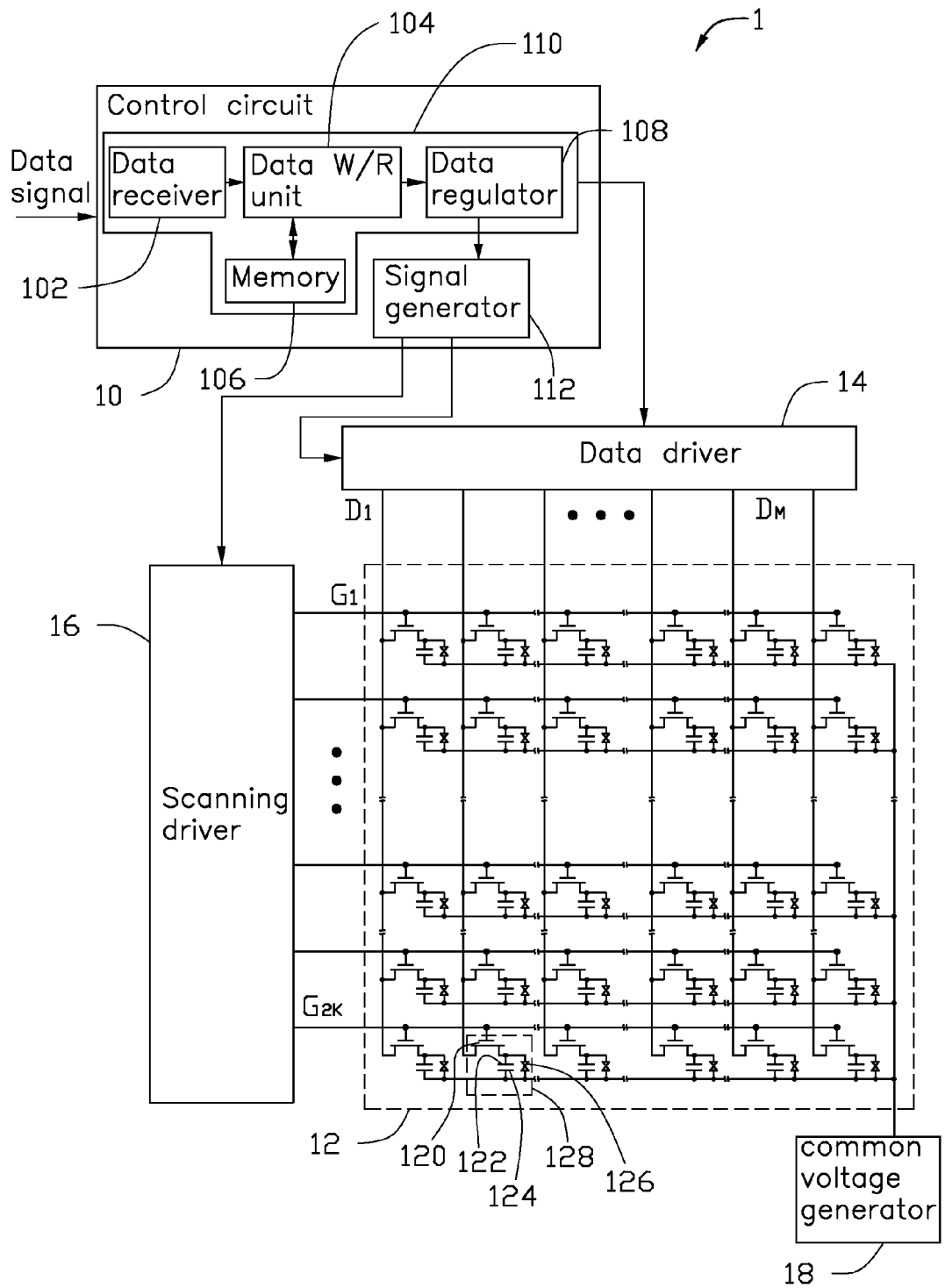
FIG. 1 is a block diagram illustrating a first embodiment of a liquid crystal display of the present disclosure, the liquid crystal display including a control circuit and a liquid crystal panel having a plurality of pixel units arranged as a (2 k×m) matrix array.

Referring to FIG. 1, a liquid crystal display (LCD) according to a first embodiment of the present disclosure is shown. The LCD 1 includes a liquid crystal panel 12, a data driver 14, a scanning driver 16, a control circuit 10 and a common voltage generator 18. The data driver 14 and the scanning driver 16 are configured to drive the liquid crystal panel 12. The control circuit 10 is coupled to the data driver 14 and the scanning driver 16, and is configured to process received data signals before these data signals are output to the liquid crystal panel 12, and control the data and scanning drivers 14, 16. The common voltage generator 18 is configured to provide a common voltage to the liquid crystal panel 12.

The liquid crystal panel 12 includes a plurality of data lines $D_1$-$D_M$ parallel to each other, a plurality of scanning lines $G_1$-$G_{2K}$ parallel to each other and intersecting with the data lines $D_1$-$D_M$, where K and M are natural numbers. A minimum region formed by the scanning lines $G_1$-$G_{2K}$ and the data lines $D_1$-$D_M$ defines a pixel unit 128. Each pixel unit 128 has a same structure, and includes a pixel electrode 122 connecting to one of the data lines $D_1$-$D_M$ via a corresponding switching element 120, such as a thin film transistor (TFT) located at a corner of the pixel unit 128, a common electrode 124 and a storage capacitor 126. The pixel electrode 122, the common electrode 124 and liquid crystal molecules form a liquid crystal capacitor (not labeled). The storage capacitor 126 is connected to and in parallel with the liquid crystal capacitor. In the embodiment, the pixel units 128 are arranged as a (2K×M) matrix array. The pixel electrodes 122 arranged in a same column connect to a same one of the data lines $D_1$-$D_M$, for example, the pixel electrodes 122 in a first column connect to the data lines $D_1$.

The scanning lines $G_1$-$G_{2K}$ provide a plurality of scanning signals transmitted from the scanning driver 16 to the switching elements 120 connected thereto to control the switching elements 120 to be switched on or off. When the scanning signal is applied to switch on the switching elements 120 via a corresponding one of the scanning lines $G_1$-$G_{2K}$, the data lines $D_1$-$D_M$ provide data signals transmitted from the data driver 14 to the corresponding pixel electrodes 122 via the switched-on switching elements 120. At the same time, the common voltage generated by the common voltage generator 18 is applied to the common electrodes 124. Thereby, electric fields are generated by voltage differences between the data voltages and the common voltage to control twist angles of the liquid crystal molecules.

In order to prevent the liquid crystal molecules from decomposing, the electric field direction is inverted periodically. In the embodiment, the LCD 1 is driven by an inverting method that satisfies polarities of the voltage differences applied on the pixel units 128 at the any two adjacent columns being opposite to each other, and the polarities of the whole pixel units 128 is inverted once at intervals of a period of one frame. For example, the polarities of the pixel units 128 at the first column connecting to the data line $D_1$ are inverted to the polarities of the pixel units 128 at a second column connecting to the data line $D_2$. At the same time, the polarities of the whole pixel units 128 corresponding to an Nth frame are inverted to that of the whole pixel units 128 corresponding to a (N+1)th frame.

Figure 2:
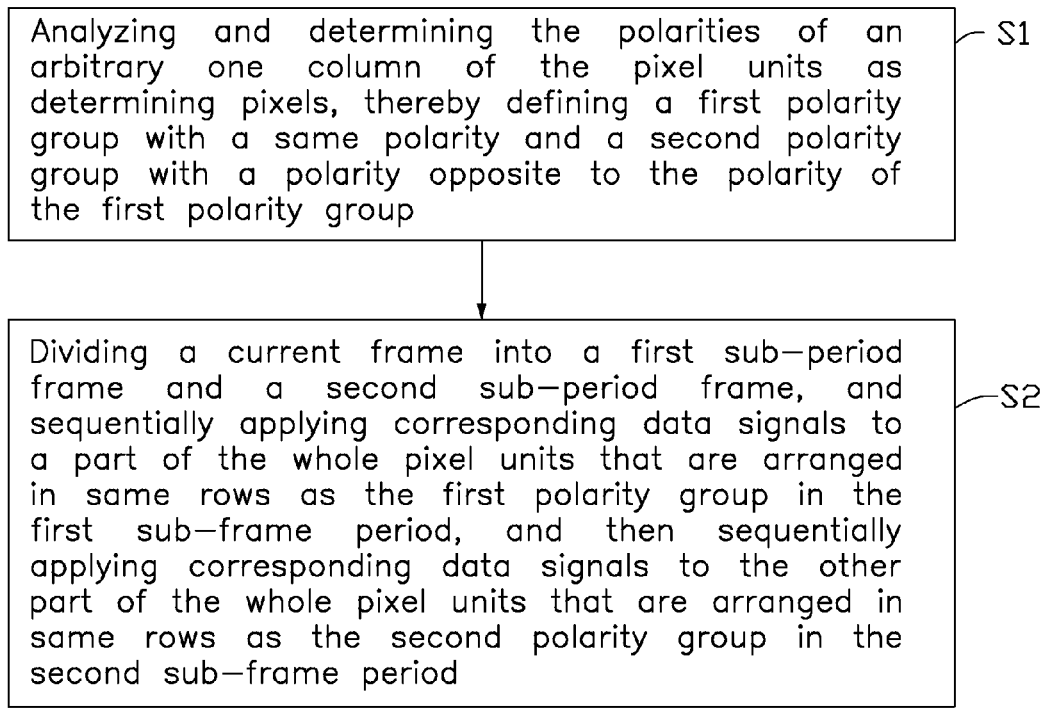
FIG. 2 is a flowchart view of an inverting driving method for driving the LCD of FIG. 1.

Referring also to FIG. 2, a flowchart of the inverting method for driving the LCD 1 is shown. The inverting method for driving the LCD 1 includes steps S1-S2 as follows: step S1, analyzing and determining the polarities of an arbitrary one column of the pixel units 128 as determining units, thereby defining a first polarity group with a same polarity and a second polarity group with a polarity opposite to the polarity of the first polarity group; and step S2, dividing a current frame into a first sub-frame period and a second sub-frame period, and sequentially applying corresponding data signals to a part of the whole pixel units that are arranged at same rows with the first polarity group in the first sub-frame period, and then sequentially applying corresponding data signals to the other part of the whole pixel units that are arranged at same rows with the second polarity group in the second sub-frame period. More details of the inverted method are described as follows:

In the step S1, the pixel units 128 at an arbitrary column j (where j denotes column number and is selected from 1 to M) is selected as the determining units. Preferably, referring to FIG. 3, the pixel units 128 at a (2K×1) array that all connect to the data line $D_1$ are selected as the determining units. Referring also to FIG. 4, waveforms of a group of control signals including synchronous signals and a polarity control signal applied to the control circuit 10 are shown. A plurality of data signals corresponding to an Nth frame with corresponding synchronous signals and a polarity control signal POL are provided to the control circuit 10. The control circuit 10 temporarily stores these signals. The synchronous signals include a vertical synchronous signal Vsync configured for determining which one of the scanning lines $G_1$-$G_{2K}$ is to be scanned, and a horizontal synchronous signal Hsync configured for determining which one of the data lines $D_1$-$D_M$ is to be applied with a corresponding data signal. The vertical synchronous signal Vsync is in a form of waveform having a plurality of pulses at intervals of a first period. The number of the pulse signals of the vertical synchronous signal Vsync denotes which line of the scanning line $G_1$-$G_{2K}$ is to be scanned. For example, when the control circuit 10 receives a first pulse signal of the vertical synchronous signal, a scanning signal is generated to scan the scanning line $G_1$. When the control circuit receives a Xth (X is a natural number and ranges from 1 to 2K) pulse of the vertical synchronous signal Vsync, accordingly, a Xth scanning signal is generated to scan the scanning line $G_X$. The horizontal synchronous signal Hsync is also in a form of waveform having a plurality of pulse signals at intervals of a second period less than the first period. The number of the pulse signals of the horizontal synchronous signal denotes which line of the data lines $D_1$-$D_M$ is to be applied with a corresponding data signal. For example, when the control circuit 10 receives a first pulse signal of the horizontal synchronous signal Hsync, a first line of the data line $D_1$ is applied with the corresponding data signal. When receiving an Yth (Y is a natural number and ranges from 1 to M) pulse signal of the horizontal synchronous signal Hsync, accordingly, a Yth line of the data line $D_Y$ is applied with the corresponding data signal. Each time when receiving one pulse signal of the vertical synchronous signal Vsync, a plurality of pulse signals of the horizontal synchronous signal Hsync start to generate for controlling that the data signals start to be applied to the whole of data lines $D_1$-$D_M$. That is, one pulse signal of the vertical synchronous signal Vsync corresponds to the 1-M numbered pulse signals of the horizontal synchronous signal Hsync. The polarity control signal POL determines the polarity of the data signals to be applied to the data lines $D_1$-$D_M$, and is preset according to a polarity requirement of a driving method employed by the display device, such as a 1-2 lines inversion method. The polarity control signal POL is a swing waveform that continuously swings from a high level (e.g. logic 1) to a low level (e.g. logic 0). When a signal level of the polarity control signal POL is set to the high level, the polarity of the data signal or the pixel unit 128 is set to positive; otherwise, the polarity of the data signal or the pixel unit 128 is set to negative. Therefore, the polarity of the pixel unit 128 located at i-th row and j-th column can be obtained by detecting the signal level of the polarity control signal POL corresponding to a j-th numbered single pulse of the horizontal synchronous signal Hsync after a start time of generating a i-th numbered single pulse of the vertical synchronous signal Vsync.

Figure 3:
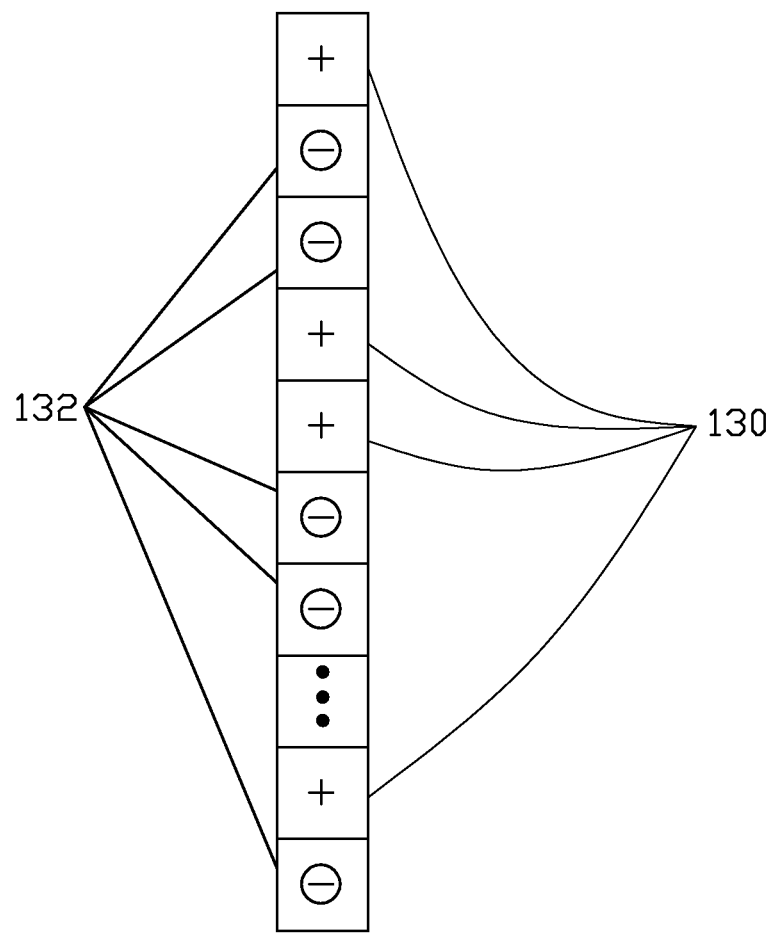
FIG. 3 illustrates when the LCD displays an image of an Nth frame, polarities of the pixel units at a (2 k×1) array of FIG. 1.
Figure 4:
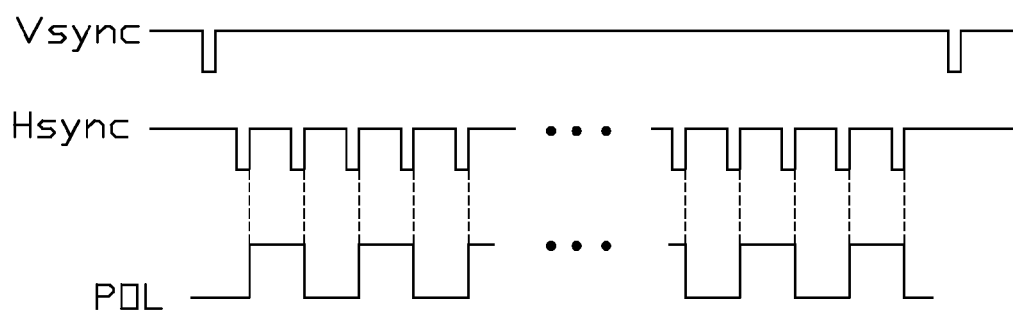
FIG. 4 illustrates waveforms of a group of control signals applied to the control circuit of FIG. 1.

An example of a step of analyzing and determining the polarities of the determining units as shown in FIG. 3 according to the polarity control signal is described as follows.

In FIG. 3, the determining units are the pixel units 128 at a (2K×1) array that all connect to the data line $D_1$. Therefore, the determining units are controlled by the scanning lines $G_1$-$G_{2K}$ and the first data line $D_1$. In each frame, the numbered 1-2K signal pulses of the vertical synchronous signal Vsync control the scanning lines $G_1$-$G_{2K}$, and at the same time, first signal pulses of the horizontal synchronous signal Hsync corresponding to each of the numbered 1-2K signal pulses of the vertical synchronous signal Vsync are used to control the first data line D1. The control circuit 10 analyzes and determines the polarities of the determining units by detection or sampling of the signal levels of the polarity control signal POL corresponding to these first signal pulses of the horizontal synchronous signal Hsync.

Thus, the determining units are divided into a first polarity group 130 having a same polarity and a second polarity group 132 having a different polarity with the first polarity group 130. After the determining polarity of the determining units, a step of determining row numbers of the determining units corresponding to at least one of the first polarity group 130 and the second polarity group 132 and then the recorded row numbers are added. The row numbers of the determining units can be obtained by calculating the number of the pulse signals of the vertical synchronous signal. In the embodiment, the first polarity group 130 is a positive polarity group and the second polarity group 132 is a negative polarity group. Referring to FIG. 3, the determined polarities of the determining units sequentially correspond to +, −, −, +, +, −, −, . . . +, −, where the positive polarity of each determining unit denotes by a symbol "+", and the negative polarity of each determining unit denotes by a symbol "−" with a circle. The polarities of the determining units at rows 1, 4 and 5 are positive, and the polarities of the determining units at rows 2, 3 and 6 are negative.

Alternatively, if the LCD 1 is driven by a specific inversion method with a regular order of transiting the polarity along a column direction of the pixel array, such as the 1-2 line inversion method, when the polarity of the pixel unit 128 located at the first column and the first row is obtained, the polarities of other determining units can be directly calculated according to the regular order. At the same time, the row numbers of the determining units corresponding to any one of the first polarity group 130 and the second polarity group 132 can be simply obtained according to the regular order. Therefore, the control circuit 10 merely detects the first signal level of the polarity control signal POL when the polarity control signal normally outputs. For example, when the liquid crystal display is driven by the 1-2 lines inversion method, and the first signal level of the polarity control signal POL is positive (as shown in FIG. 4), the polarity of the pixel unit 128 located at the first column and first row is positive, and the polarity of the determining units can be directly calculated according to the regular order of the 1-2 lines inversion method. That is, the polarities of the determining units are "+", "−" "−", "+", "+", "−", "−", "+", . . . "+", "−", "−", "+", and the row numbers corresponding to the positive polarity units are 1, 4, 5, 8, . . . 2K.

Figure 5:
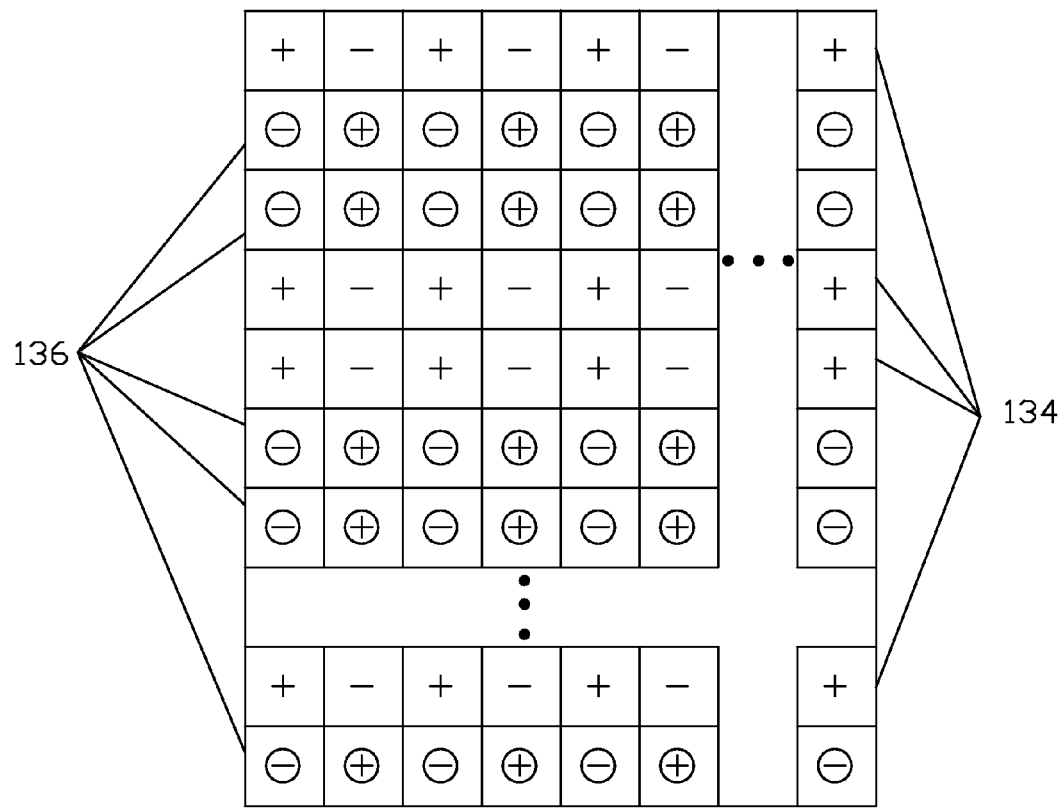
FIG. 5 illustrates when the LCD displays the image of the Nth frame, the polarities of the whole pixel units of the liquid crystal panel of FIG. 1.
Figure 6:
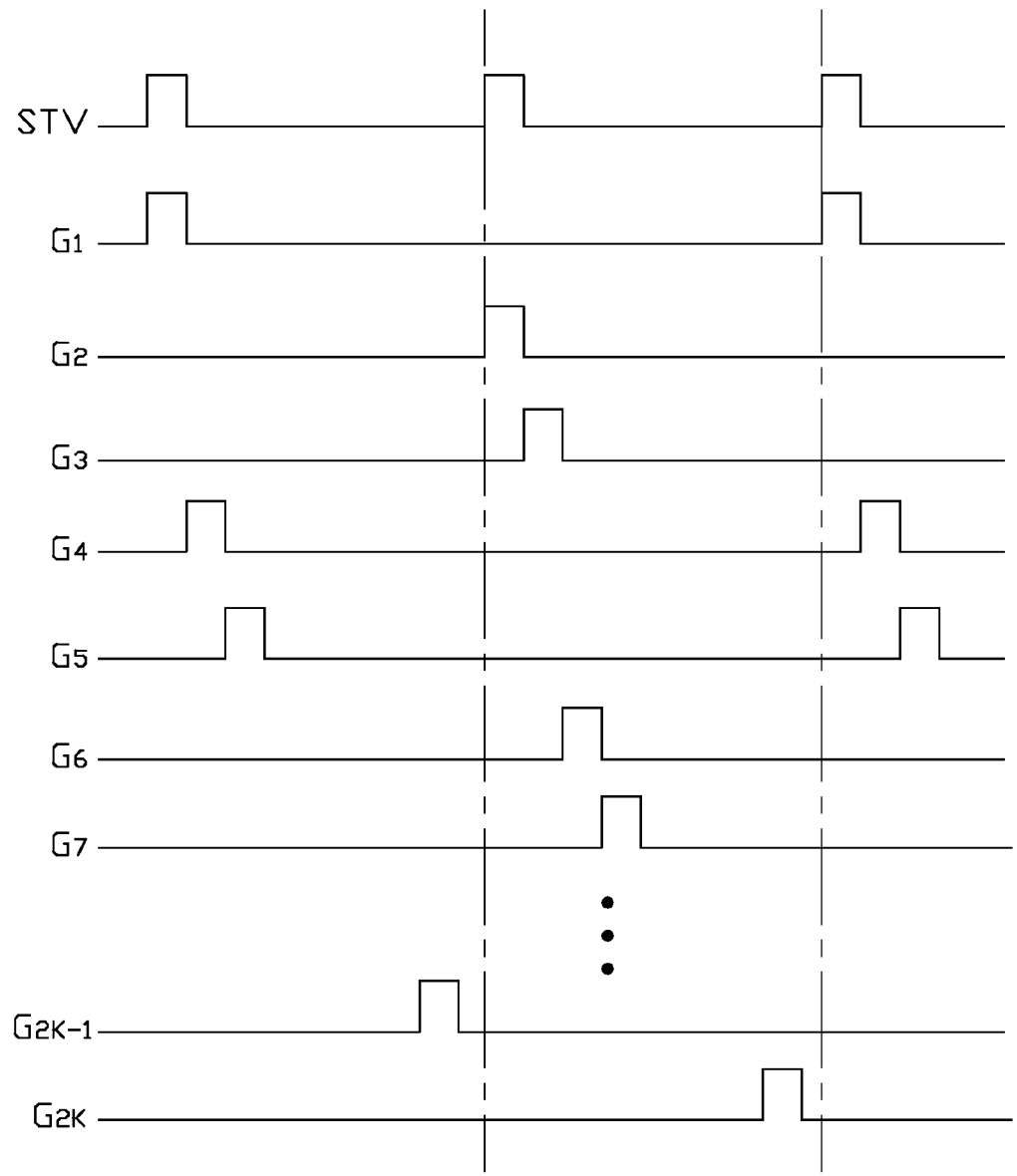
FIG. 6 is an operation timing diagram of the LCD of FIG. 1.

In the step S2, referring to FIGS. 5-6, a part of the pixel units 128 that are located at same rows with the first polarity group 130 are defined as a first pixel group 134, and the other part of the pixel units 128 that are located in the same rows as the second polarity group 132 are defined as a second pixel group 136. The control circuit 10 rearranges a timing order of scanning the scanning lines $G_1$-$G_{2K}$, so that the data signals corresponding to the first pixel group 134 are previously and sequentially applied to the corresponding pixel units 128. Sequentially, the data signals corresponding to the second pixel group 136 are continuously applied to the corresponding pixel units 128. For example, supposing that the pixel units 128 are arranged as a 6×M array (where K is set to 3), the positive polarity group 132 corresponds to rows 1, 4 and 5, and the negative polarity group 134 corresponds to 2, 3 and 6, the control circuit 10 rearranges the scanning order that follows as $G_1$, $G_4$, $G_5$, $G_2$, $G_3$ and $G_6$. Therefore, the corresponding pixel units 128 located at the first pixel group 134 and connected to the scanning lines $G_1$, $G_4$, and $G_5$ are sequentially and previously provided with the corresponding data signals. Then the pixel units 128 located at the second pixel group 136 and connected to the scanning line $G_2$, $G_3$, $G_6$ are sequentially provided with the corresponding data signals. In the embodiment, the Nth frame can be divided into two equivalent sub-frames under control of a single transferable vote (STV) configured to trigger the output of a set of the scanning signals. When a first STV is output by the external circuit, the scanning signals corresponding to the first pixel group 134 start to output, and when a second STV is output, the scanning signals corresponding to the second pixel group 136 start to output.

After the above steps, the data signals corresponding to a (N+1)th frame are transmitted to the control circuit 10, the control circuit 10 repeats the step S2.

In the above inverted method, because of a time that the pixel units 128 are provided with the data signals having one type of the polarities is previously to a time that the pixel units 128 are provided with the data signals having another type of the polarities, an inverted process merely occurs at the time that the data signals are applied from the pixel units 128 with one type of the polarities to the pixel units 128 with another type of the polarities. No inverted process occurs at the time that the data signals are applied to the pixel unit 128 with a same type polarity. This means the polarities of the data signals can keep a longer time thereby causing the pixel units 128 to obtain a sufficient charge time. In addition, because the polarities of the pixel units 128 at each frame merely change once, a low frequency of inverting the polarity also reduces the power consumption.

Referring to FIG. 1, an example of the control circuit 10 is shown. The control circuit 10 includes a data processing unit 110 and a signal generator 112 coupled to the data processing unit 110. The data processing unit 110 receives the data signals, the synchronous signals and the polarity control signal generated from the external circuit. The data signals are temporally stored into a memory 106, which can be embedded into the data processing unit 110. The data processing unit 110 includes a data regulator 108 that analyzes and determines polarities of the data signals, and rearranges the timing order of scanning the scanning lines $G_1$-$G_{2K}$ according to the determining result. The signal generator 112 generates a first control signal and a second control signal to drive the scanning driver 16 and the data driver 14 according to the rearranged output timing order.

In detail, the data regulator 108 is capable of controlling a data writing/reading/(W/R) unit 104 to read or write the data signals or directly read or write the data signal from the memory 106. When receiving the data signals with the corresponding synchronous signals and the polarity control signal of a Nth frame, the data regulator 108 analyzes the polarities of the data signals of the determining units by detecting the signal levels of the polarity control signal, thereby defining a first polarity group 130 (e.g. positive polarity group) and a second polarity group 132 (e.g. negative polarity group). The data regulator 108 further records the row numbers corresponding to at least one of the first polarity group 130 and the second polarity group 132.

Then, the signal generator 108 rearranges the timing order of scanning the scanning lines $G_1$-$G_{2K}$ according to the recorded row numbers and output a regulating signal to the signal generator 112. The signal generator 112 generates the first control signal to drive the scanning driver 16 according to the first control signal, so that the scanning driver 16 previously outputs one part of the scanning signals for driving the pixel units 128 located in the same rows as the first polarity group 130, and then sequentially outputs the other part of the scanning signals for driving the pixel units 128 located in the same rows as the second polarity group 132. At the same time, the signal generator 112 also outputs the second control signal to drive the data driver 14 to start working. That is, when the row numbers only corresponding to the first polarity group 130 are recorded, the signal generator 112 previously controls the scanning driver 16 and the data driver 14 to output one part of the scanning signals for driving the pixel units 128 corresponding to the recorded rows numbers and the corresponding data signals respectively. Then the signal generator 112 sequentially controls the scanning driver 16 and the data driver 14 to output the other part of the scanning signals for driving the pixel units 128 and the corresponding data signals respectively.

In the embodiment, the first control signal includes the STV signal having at least two high-level signals in one frame. When the scanning driver 16 receives a first high-level signal, the scanning driver 16 previously and sequentially outputs the scanning signals corresponding to the row numbers of one of the first and second polarity groups 130, 132. When the scanning driver 16 receives a second high-level signal, the scanning driver 16 previously and sequentially outputs corresponding scanning signals corresponding to the row numbers of another one of the first and second polarity groups 130, 132. Thus, the control circuit 10 finishes rearranging the timing order of scanning the scanning lines $G_1$-$G_{2K}$.

The data processing unit 110 further includes a data receiver 102 for receiving the data signals, the synchronous signals and the polarity control signal generated from the external circuit.

Figure 7:
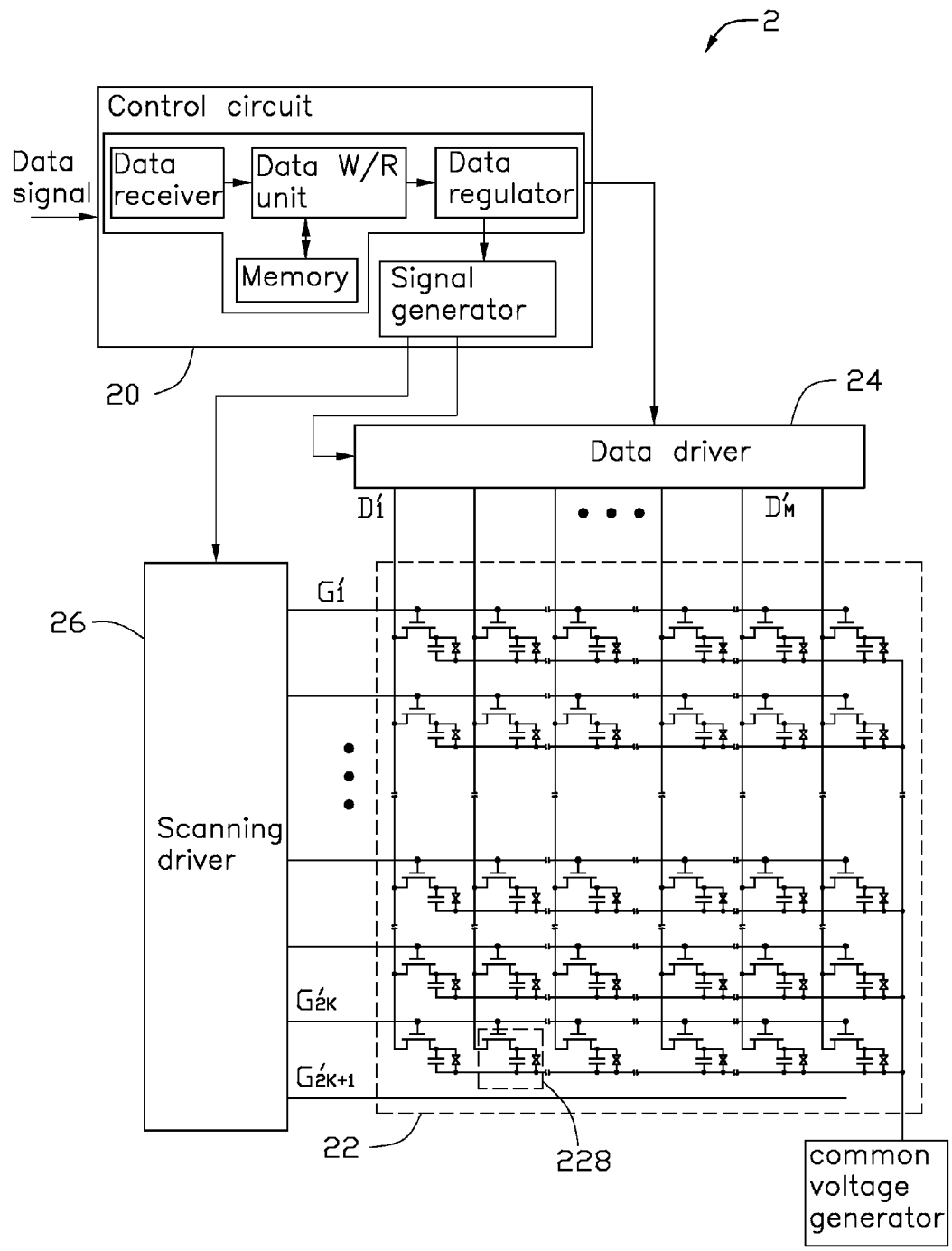
FIG. 7 is a block diagram illustrating a second embodiment of a liquid crystal display of the present disclosure, the liquid crystal display including a liquid crystal panel having a plurality of pixel units arranged as a (2 k×m) matrix array.

Referring to FIG. 7, an LCD 2 according to a second embodiment of the present disclosure is shown. The LCD 2 has a similar structure with the LCD 1 of the first embodiment. However, an LCD panel 22 further includes a dummy scanning line $G_{2K+1}'$ without connecting to any pixel unit 228 which has a pixel electrode 222 and a switching element 220. The dummy scanning line $G_{2K+1}'$ is a floating line that is parallel to scanning lines $G_1'$-$G_{2K}'$ of the LCD panel 22. A plurality of scanning signals are correspondingly provided to the scanning lines $G_1'$-$G_{2K}'$ and the dummy scanning line $G_{2K+1}'$. During the time that the dummy scanning line $G_{2K+1}'$ is scanned, data lines $D_1'$-$D_M'$ are applied with a pre-charge voltage respectively.

Figure 8:
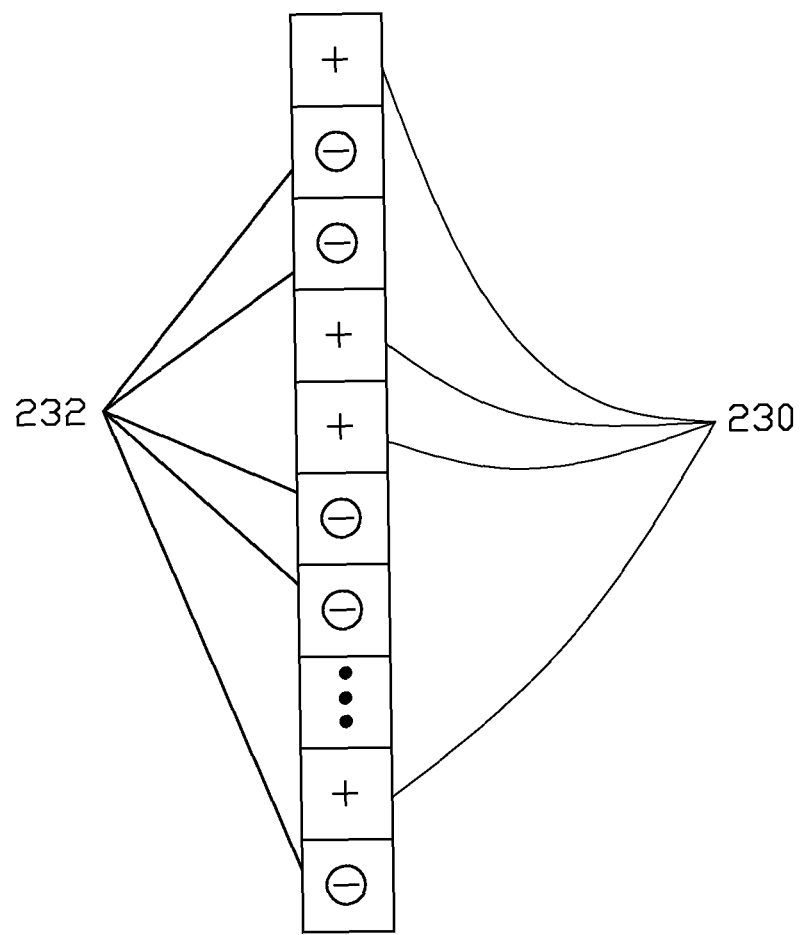
FIG. 8 illustrates when the LCD displays an image of an Nth frame, polarities of the pixel units at a (2 k×1) array of FIG. 7.
Figure 9:
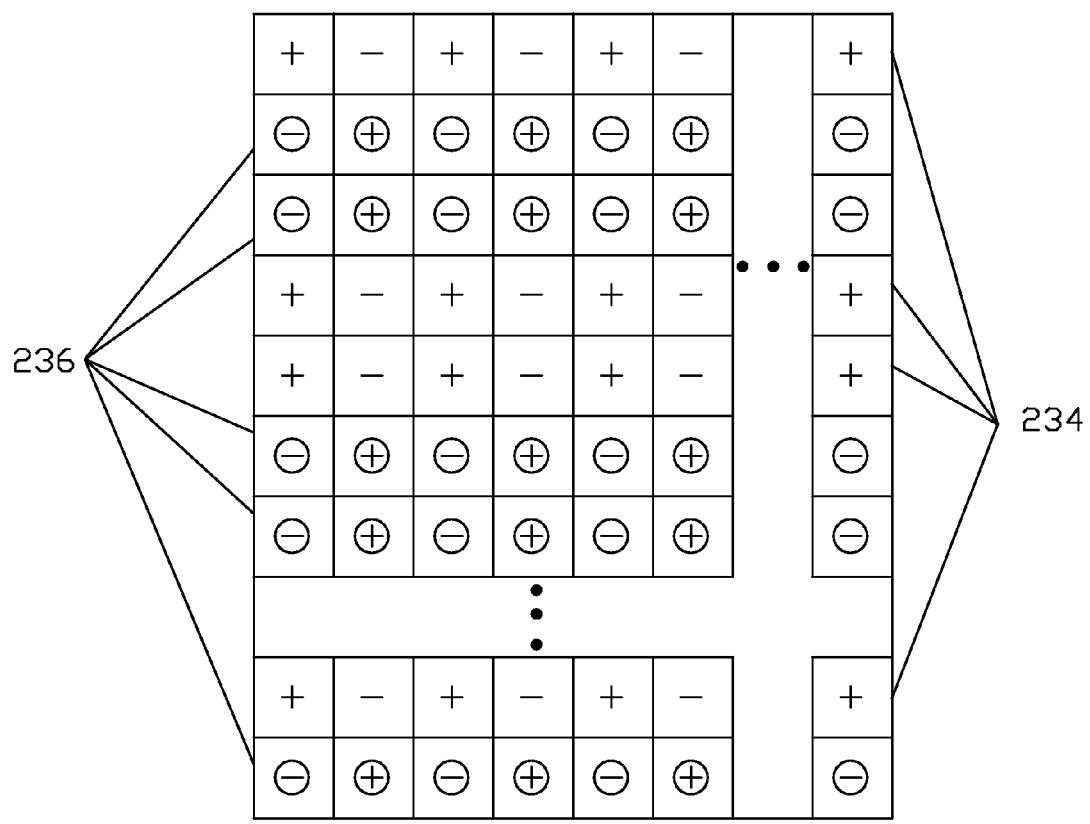
FIG. 9 illustrates when the LCD displays the image of the Nth frame, the polarities of the whole pixel units of the liquid crystal panel of FIG. 7.

To easily understand, an example of polarities of determining units and an example of the whole pixel units 228 are respectively shown in FIG. 8 and FIG. 9. If supposing the pixel units 228 at a (2 k×1) array is regarded as the determining units, the pixel units 228 at the same rows with the determining units each having a positive polarity are regarded as a first pixel group 234, and the pixel units 228 at the same rows with the determining units each having a negative polarity are regarded as a second pixel group 236. In FIG. 8, the pixel units 228 at rows 1, 4, 5, ... and (2 k−1) belong to the first pixel group 234, and the pixel units 228 at rows 2, 3, 6, 7 ... and 2 k belong to the second pixel group 236.

Figure 10:
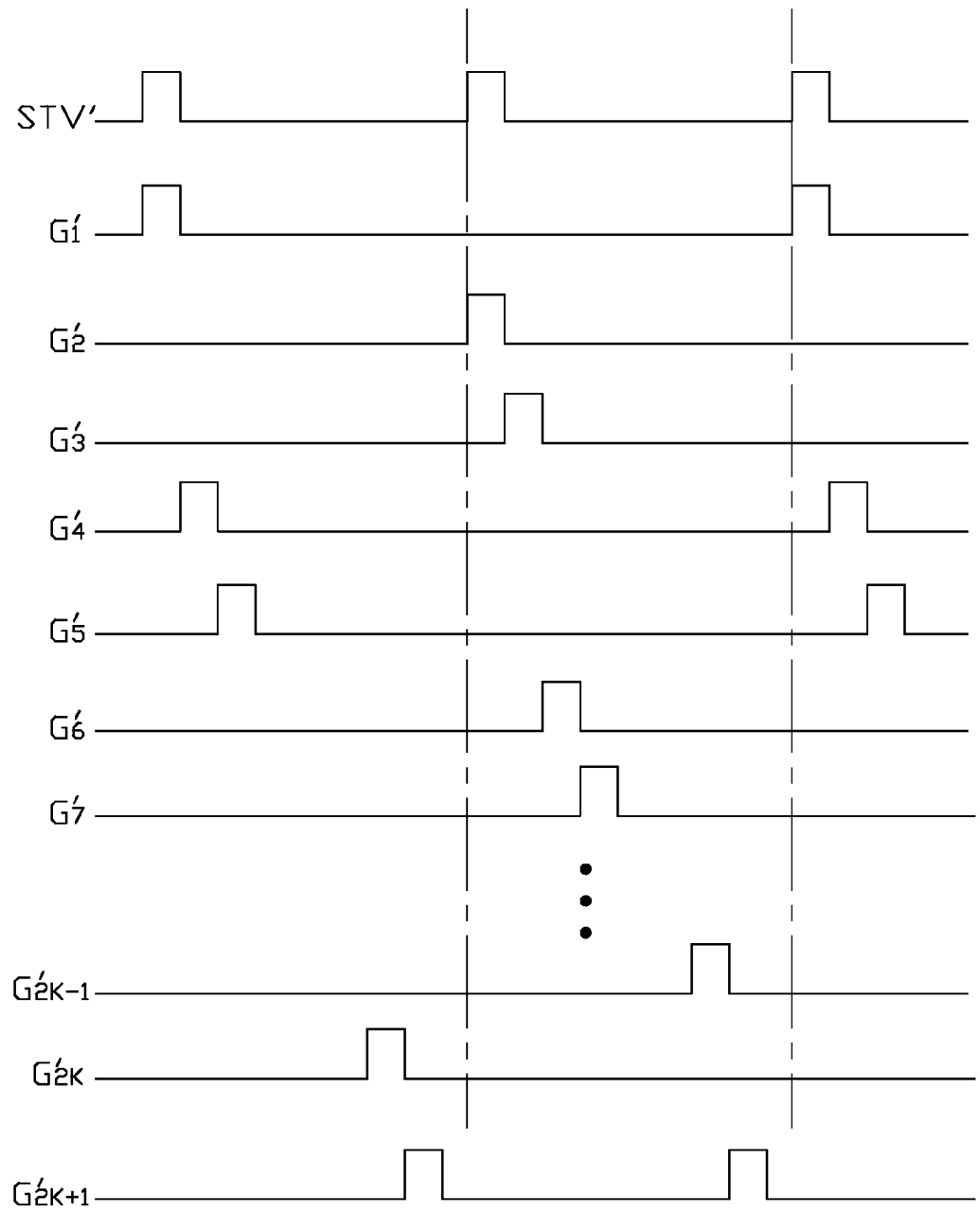
FIG. 10 is an operation timing diagram of the LCD of FIG. 7.

Referring also to FIG. 10, in a first pre-charge period of a Nth frame after the scanning lines (e.g. $G_1'$, $G_4'$, $G_5'$, ... $G_{(2K-1)}'$) corresponding to the first pixel group 234 are scanned and before a start time of scanning the scanning lines (e.g. $G_2'$, $G_3'$, $G_6'$, ... $G_{2K}'$), a control circuit 20 generates a first pre-charge voltage, and then outputs the pre-charge voltage to the data driver 24 and a scanning signal to the scanning driver 26. The data driver 24 sequentially outputs the first pre-charge voltage to the data lines $D_1'$-$D_M'$ during a period that the dummy gate line $G_{2K+1}'$ is scanned. Preferably, in the first pre-charge period, the first pre-charge voltage has a same polarity with the data signals at first row (e.g. row 2) of the second pixel group 234. Therefore, the first pre-charge voltage can be obtained by copying or repeatedly reading out the corresponding data signals stored in the control circuit 20. Then, the data signals corresponding to the second pixel group 234 are applied to the corresponding pixel units 228 and an image corresponding to the Nth frame is displayed.

The data signals corresponding to a (N+1)th frame are received by the control circuit 20. In a second pre-charge period when before the data signals of the (N+1)th frame is displayed and after the scanning lines (e.g. $G_2'$, $G_3'$, $G_6'$, ... $G_{2K}'$) corresponding to the second pixel group 234 are scanned, the dummy gate line $G_{2k+1}'$ is scanned again. Simultaneously, the control circuit 20 generates a second pre-charge voltage, and then outputs the second pre-charge voltage to the data driver 24 and the scanning signal to the scanning driver 26. The data driver 24 sequentially outputs the pre-charge voltage to the data lines $D_1'$-$D_M'$ during a period that the dummy gate line $G_{2K+1}'$ is scanned. Preferably, in the second pre-charge period, the second pre-charge voltage has a same polarity with the data signals at first row (e.g. row 1) of the first pixel group 234 in the (N+1)th frame. Therefore, the pre-charge voltage also can be obtained by copying or repeatedly reading out the corresponding data signals stored in the control circuit 20. Then the data signals of the first pixel group 234 of the (N+1)th frame are output to the data lines $D_1'$-$D_M'$.

According to the above, because the first pre-charge voltage corresponds to the data signals of the second pixel group 236 of the Nth frame, and the second pre-charge voltage corresponds to the data signals of the first row of the first pixel group 234 of the (N+1)th frame, the data lines $D_1'$-$D_M'$ are pre-charged by the first and second pre-charge voltages during the period that the dummy gate line $G_{2K+1}'$ is scanned. Thus, the polarity of the data signals corresponding to the second pixel group 236 of the Nth frame is the same as that of the first pre-charge voltage, and the polarity of the data signals corresponding to the first pixel group 234 of the (N+1)th frame is the same as these of the second pre-charge voltage. No inverting process occurs between the first pixel group 234 and the second pixel group 236, so that the pixel units 228 at the first row both of the first pixel group 234 and the second pixel group 236 can be charged sufficiently. In particularly, when a voltage value of the first pre-charge voltage is the same as that of the data signal at the first row of the second pixel group 236 in a same frame, and a voltage value of the second pre-charge voltage is the same as that of the data signal at the first row of the first pixel group 234 of a next frame, there is no voltage difference between the first and second pre-charge voltages and the data signals to be output, thereby charging the pixel units 228 at the first row both of the first pixel group 234 and the second pixel group 236 more sufficiently.

An inverting driving method of the LCD 2 is also similar to the inverting driving method of the LCD 1. However, one difference of the inverting driving method of the LCD 2 is that an electric pre-charge step is added after finishing the output of the data signals to the first pixel group 234 or finishing the output of the data signals to the second pixel group 236.

In detail, in step S2, after the data signals corresponding to the whole first pixel group 234 are provided to the corresponding pixel units 228, the dummy scanning line $G_{2K+1}'$ is scanned, and the control circuit 20 generates the first pre-charge voltage to pre-charge the data lines $D_1'$-$D_M'$. The first pre-charge voltage has the same polarity with the data signals corresponding to the pixel units 228 in a first row (e.g. at row 2) of the second pixel group 236. Then the data signals corresponding to the second pixel group 236 are continuously applied to the corresponding pixel units 228, thereby the data signals of the Nth frame are completely output to the liquid crystal panel 22. After finishing the output of the data signals of the Nth frame, the dummy scanning line $G_{2K+1}'$ is scanned again, and the control circuit 20 generates the second pre-charge voltage to pre-charge the data lines $D_1'$-$D_M'$. The second pre-charge voltage has the same polarity with the data signals corresponding to the pixel units 228 at a first row of the first pixel group 234 at the (N+1)th frame. Then the data signals corresponding to the first pixel group 234 at the (N+1)th frame are continuously applied to the corresponding pixel units 228.

It is to be understood, however, that even though numerous characteristics and advantages of the present embodiments have been set out in the foregoing description, together with details of the structures and functions of the embodiments, the disclosure is illustrative only; and that changes may be made in detail, especially in matters of shape, size and arrangement of parts within the principles of the disclosure to the full extent indicated by the broad general meaning of the terms in which the appended claims are expressed.

What is claimed is:

1. A liquid crystal display (LCD), comprising:
   a plurality of data lines;
   a plurality of scanning lines;
   a plurality of pixel units defining by the data lines and the scanning lines, the pixel units arranged as a matrix array with a plurality of columns and rows;
   a data driver providing a plurality of data signals;
   a scanning driver providing a plurality of scanning signals; and
   wherein an arbitrary one column of the matrix array is selected and divided into two pixel groups according to the polarities of the data signals applied to the pixel units within a current frame, one of the pixel groups with a same polarity is defined as a first polarity group and another one of the pixel groups with a polarity opposite to the polarity of the first polarity group is defined as a second polarity group, and the data driver outputs corresponding data signals to the first polarity group and then outputs corresponding data signals to the second polarity group;
   wherein after the corresponding data signals finish writing to one of the first polarity group and the second polarity group, a step of pre-charging one of the data lines sequentially follows.

2. The LCD of claim 1, wherein the LCD further comprises a control circuit coupled to the data driver and the scanning driver, the control circuit being capable of determining polarities of the data signals.

3. The LCD of claim 2, wherein the control circuit determines polarities of the data signals applied to the selected column of the matrix array which comprise a vertical synchronous signal, a horizontal synchronous signal and a polarity control signal before the data signals are applied to the data line connected to the selected column of the matrix array, wherein the polarity control signal comprises two types of signal levels including a high level and a low level and a corresponding signal level of the polarity control signal determines the polarities of the data signals to be applied to the data line connected to the selected column of the matrix array.

4. The LCD of claim 3, wherein the control circuit determines polarities of the data signals applied to the selected column of the matrix array by detecting the signal levels of the polarity control signal.

5. The LCD of claim 3, wherein the vertical synchronous signal is configured for determining which one of the scanning lines is to be scanned, and the horizontal synchronous signal is configured for determining which one of the data lines is to be applied with the corresponding data signal.

6. The LCD of claim 5, wherein the vertical synchronous signal is in a form of a waveform having a plurality of pulses at intervals of a first period, the horizontal synchronous signal is in a form of waveform having a plurality of pulse signals at intervals of a second period less than the first period, the number of the pulse signals of the vertical synchronous signal denotes which line of the scanning line is to be scanned, and the number of the pulse signals of the horizontal synchronous signal denotes which line of the data lines is to be applied with the corresponding data signal.

7. The LCD of claim 6, wherein the control circuit further determines row numbers of the selected column of the matrix array corresponding to at least one of the first polarity group and the second polarity group and then recording the row numbers.

8. The LCD of claim 7, wherein the determining the row numbers of the selected column of the matrix array corresponding to at least one of the first polarity group and the second polarity group is carried out by calculating the number of the pulse signals of the vertical synchronous signal.

9. The LCD of claim 2, wherein if the LCD is driving by an inversion method having a regular order of transiting the polarities of the pixel units along a column direction, the control circuit determines the polarity of one of the selected column, and then directly obtains the polarities of other pixel units of the selected column and corresponding row numbers according to the regular order.

10. The LCD of claim 2, wherein the control circuit rearranges a timing order of scanning the scanning lines, so that a time that the scanning lines connecting to the pixel units of the first polarity group are scanned is previous to a time that the scanning lines connecting to the pixel units of the second polarity group are scanned.

11. The LCD of claim 2, wherein the control circuit starts to pre-charge the corresponding data line coupled to the selected column after the corresponding data signals finish writing to one of the first polarity group and the second polarity group and provides a pre-charge voltage to the corresponding data line coupled to the selected column.

12. The LCD of claim 11, wherein when, after the corresponding data signals finish writing to the first polarity group and before a start time of the corresponding data signals writing to the second polarity group, the control circuit outputs a first pre-charge voltage to the corresponding data line coupled to the selected column in a first pre-charge period of the current frame.

13. The LCD of claim 11, wherein when, before the data signals of a next frame is displayed and after the corresponding data signals finish writing to the second polarity group, the control circuit outputs a second pre-charge voltage to the corresponding data line coupled to the selected column in a second pre-charge period.

14. The LCD of claim 11, wherein the LCD further comprises a dummy scanning line for receiving a dummy scanning signal, and during the time that the dummy scanning signal is applied to the dummy scanning line, the pre-charge voltage is applied to the corresponding data line coupled to the selected column.

15. The LCD of claim 11, wherein in a same frame, after the corresponding data signals finish writing to the first polarity group, the pre-charge voltage with a same polarity with the second polarity group is applied to the corresponding data line coupled to the selected column.

16. The LCD of claim 11, wherein after the corresponding data signals finish writing to the second polarity group, the pre-charge voltage with a same polarity with the first polarity group corresponding to the next frame is applied to the corresponding data line coupled to the selected column.

17. The LCD of claim 2, wherein after finishing output the corresponding data signals corresponding to the current frame both to the first polarity group and the second polarity group, the control circuit receives the data signals corresponding to the next frame and divides the frame into at least two sub-frame periods, and sequentially applying corresponding data signals to the first polarity group in one of the at least two sub-frame periods, and then sequentially applying corresponding data signals to the second polarity group in the other one of the at least two sub-frame periods.

18. A liquid crystal display (LCD), comprising:
a plurality of data lines;
a plurality of scanning lines;
a plurality of pixel units defining by the data lines and the scanning lines, the pixel units arranged as a matrix array with a plurality of columns and rows;
a data driver providing a plurality of data signals;
a scanning driver providing a plurality of scanning signals; and
a control circuit coupled to the data driver and the scanning driver, the control circuit being capable of determining polarities of the data signals;
wherein an arbitrary one column of the matrix array is selected and divided into two pixel groups according to the polarities of the data signals applied to the pixel units within a current frame, one of the pixel groups with a same polarity is defined as a first polarity group and another one of the pixel groups with a polarity opposite to the polarity of the first polarity group is defined as a second polarity group, and the control circuit controls the data driver to output corresponding data signals to the first polarity group and then output corresponding data signals to the second polarity group;
wherein the control circuit rearranges a timing order of scanning the scanning lines to control the data driver to output corresponding data signals to the first polarity group and then output corresponding data signals to the second polarity group, the control circuit is capable of temporarily storing the data signals with a vertical synchronous signal, a horizontal synchronous signal and a polarity control signal before the data signals applied to the data lines, the polarity control signal comprises two types of signal levels including a high level and a low level for determining the polarities of the data signals, and the control circuit determines the polarities of the data signals according to the signal levels of the polarity control signal.

19. The LCD of claim 18, wherein if the LCD is driving by an inversion method having a regular order of transiting the polarities of the pixel units along a column direction, the control circuit determines the polarity of one of the selected column, and then directly obtains the polarities of other pixel units of the selected column and corresponding row numbers according to the regular order.

20. The LCD of claim 18, further comprising a dummy scanning line as a floating line to receiving a dummy scanning signal, wherein during a time period that the dummy scanning line is applied with the dummy scanning signal, a pre-charge voltage generated by the control circuit is applied to the corresponding data line coupled to the selected column.

* * * * *